Aug. 5, 1947.　　　　H. F. GEORGE　　　　2,425,240
STEERING WHEEL
Filed April 4, 1945　　　2 Sheets-Sheet 1
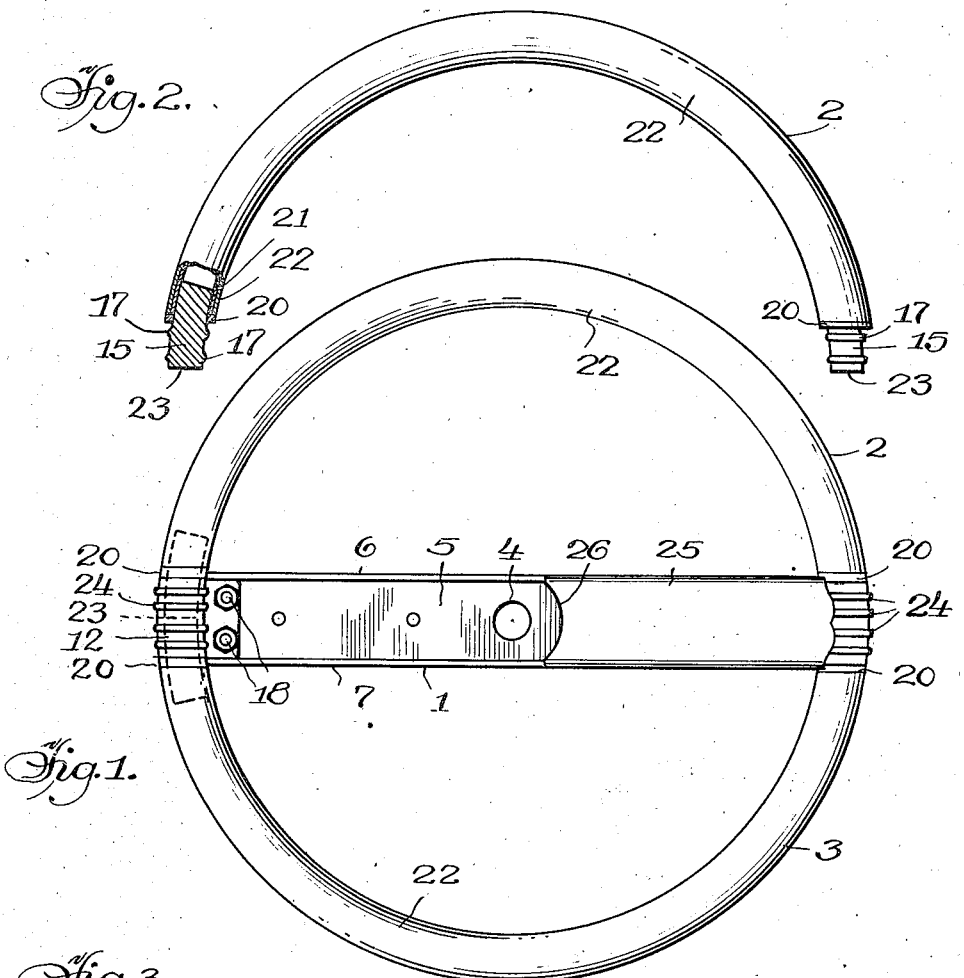
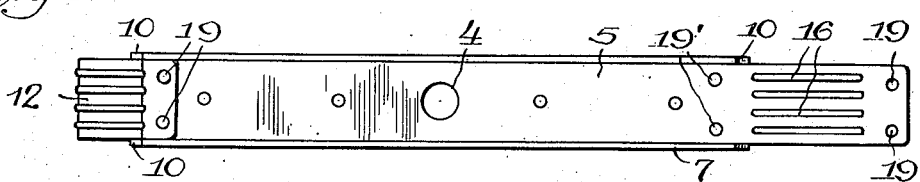
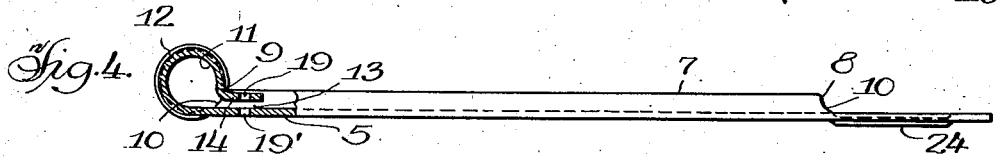
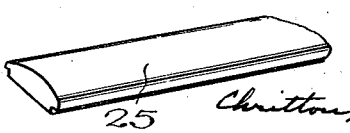
INVENTOR.
Harry F. George
BY
Chritton, Wiles, Schroeder, Merriam & Hofgren
Attys.

Aug. 5, 1947.  H. F. GEORGE  2,425,240
STEERING WHEEL
Filed April 4, 1945  2 Sheets-Sheet 2
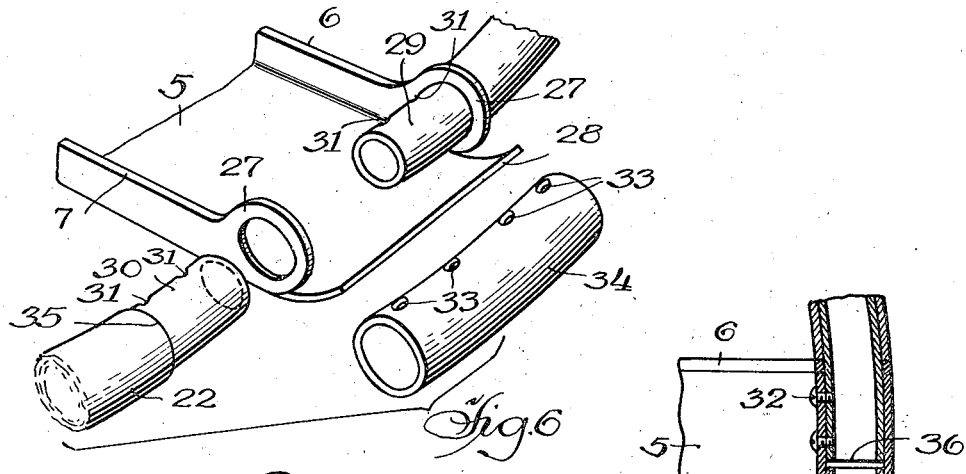
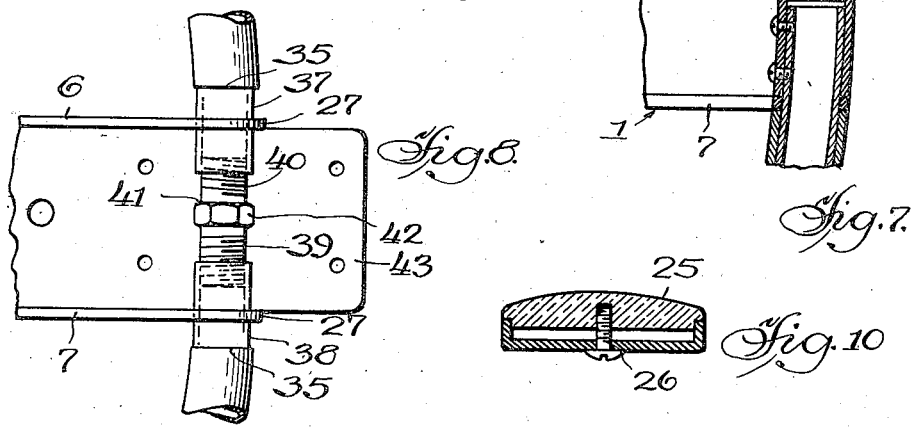
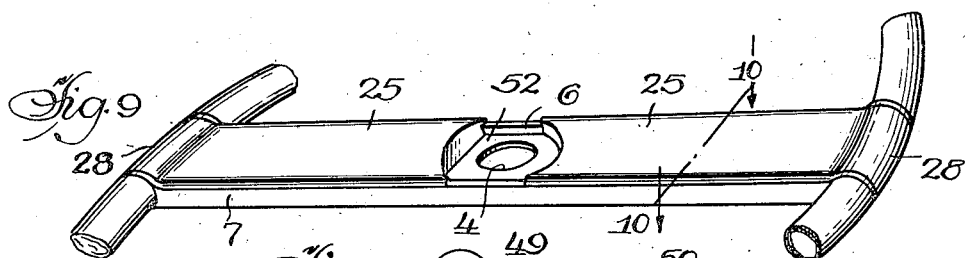
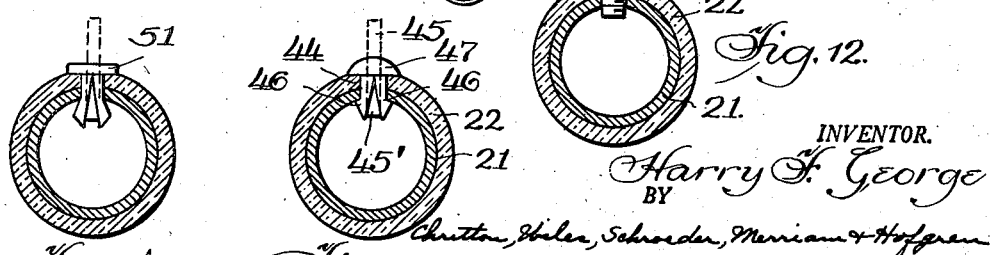
INVENTOR.
Harry F. George
BY
Chritton, Wiles, Schroeder, Merriam & Hofgren
Attys.

Patented Aug. 5, 1947

2,425,240

UNITED STATES PATENT OFFICE 2,425,240

STEERING WHEEL

Harry F. George, Chicago, Ill.

Application April 4, 1945, Serial No. 586,583

10 Claims. (Cl. 74—552)

This invention relates to a steering wheel, and more particularly to such wheel in which the rim sections when worn out may be renewed by substituting a new section for the old section or sections, and in which sections a plastic covering may be easily and effectively applied thereto, and the exposed portions of the wheel covered with plastic, to present an ornamental and pleasing appearance.

A further object of my invention is to provide a steering wheel in which the rim sections are secured to the ends of the spokes and to each other by novel connecting means, to result in a strong mounting for these parts, and to facilitate quick and easy replacement by new parts when required.

Another object is to make possible the easy application of new plastic coverings to the old rim sections when desired, to increase the ornamental appearance as well as to improve the usefulness of the steering wheel.

A still further object is to provide a novel construction and arrangement of finger gripping portions for the rim sections.

An additional object is to make the rim in two detachable parts, instead of a complete ring, with effective and ornamental means for securing them in operative position.

Another object is to provide a novel spoke construction for the steering wheel.

Further objects, advantages and capabilities, inherently possessed by my invention, will later more readily become apparent.

My invention further resides in the combination, construction and arrangement of parts illustrated in the accompanying drawings and while I have shown therein preferred embodiments I wish it understood that the same are susceptible of modification and change without departing from the spirit of my invention.

In the drawings:

Fig. 1 is a top plan view of a steering wheel embodying my invention but omitting the plastic covering over the left hand half of the spoke member.

Fig. 2 is a top plan view of one of the rim sections partly in section to more clearly show the reinforcing and connecting plug.

Fig. 3 is a top plan view of the spoke member showing the right hand end before being curled upwardly and the left hand end after having been curled upwardly to receive the ends of the rim sections.

Fig. 4 is a side edge view of Fig. 3 but showing the left hand end in section.

Fig. 5 is a fragmentary perspective view of the plastic covering for the upper surface of the spoke member.

Fig. 6 is a fragmentary perspective view of one form of joint for connecting the rim sections to the spoke, and showing the parts separated just prior to assembly.

Fig. 7 is a fragmentary horizontal section through the joint connection of Fig. 6 after completion of the joint.

Fig. 8 is a plan view of another form of joint prior to completion of the joint.

Fig. 9 is a fragmentary perspective view of the spoke member and completed joints between the ends of the rim sections and the spoke member.

Fig. 10 is a transverse vertical section on the line 10—10 of Fig. 9.

Fig. 11 is a vertical transverse section through one of the rim sections showing one form of finger gripping member.

Fig. 12 is a view similar to Fig. 11 but showing a different kind of finger gripping member.

Fig. 13 is a top plan view of the gripping member of Fig. 12.

Fig. 14 is a view similar to Figs. 11 and 12 but showing a further form of gripping member.

Referring more in detail to the drawings, my improved steering wheel comprises a spoke member 1 to the ends of which are detachably secured a pair of rim sections 2 and 3. The spoke member is formed at its center with an opening 4 adapted to be positioned over the top end of the steering shaft (not shown) and firmly secured thereto in the usual manner. This spoke member is in the form of a channel member having the main body portion 5 and along each of its side edges an upstanding flange 6 and 7, which flanges, as shown in Figs. 3 and 4, terminate at 8 and 9 in a downwardly and outwardly curved edge 10, the radius of which curvature is the same as that of the curvature of the opening 11 on the inside of the bent over socket member 12 at each end of the spoke member after these socket members have been clamped into their final position as later explained.

In Fig. 4 the left hand end of the spoke member is shown as having been curled upwardly and inwardly into almost its final position, a gap 13 between the flange 14 and the bottom 5 being provided so that the inner diameter of socket member 12 will be sufficiently large to receive the plug 15 secured in the end of the rim sections. The opposite end of the spoke member is shown in Fig. 4 before it has been bent upwardly and inwardly into its socket shape, each of these portions extending beyond the curvature 10 having a plurality of closed-end grooves 16 pressed outwardly so that the grooves are positioned on the upper face of the spoke member before bending. After the bending of these portions to form the socket members 12 the grooves 16 will be on the inside of the socket member to receive the circumferential beads 17 of plugs 15. The larger inside diameter of the socket members provided for by gap 13 enables the ends of plugs 15 to be inserted to the middle of the socket member to bring the beads into registry with the grooves 16, after which the flange 14 is pressed downwardly against bottom 5 of the spoke member and tightly clamped thereagainst by bolts or the like 18 passing through holes 19 formed in the end portions of the spoke member, and registering holes 19' formed in the body portion 5 of the spoke member. In other words, the flange 14 stands away from bottom 5 of the spoke member a suitable distance (preferably about $\frac{3}{32}$ of an inch) before said clamping action.

As will be understood in Fig. 2 the cylindrical plugs 15 are positioned with a suitably tight fit in the ends of each of the rim section tubes, but before being positioned therein will have an ornamental metal ferrule 20 applied thereover to abut against the ends of the tube 21 and the covering 22 of the rim sections. As seen in Fig. 1 the plugs 15 are each inserted into the enlarged opening in socket members 12 until the beads 17 are brought into registry with grooves 16 at which time the ends 23 of the plug members will abut, or approximately abut each other, in the middle of the socket members. When both of the rim sections and plugs have been inserted in the socket members as described above, the flanges 14 of the socket members will be pressed together and the bolts 18 tightened which firmly holds the beads 17 within grooves 16 and prevents any displacement longitudinally of the plugs. When it is desired to remove one or both of the rim sections in order to substitute a new section, or return to its position a repaired section, this can be done by loosening bolts 18 which will, due to the resiliency of the metal of the socket members, cause flange 14 to spring upwardly and again open up gap 13 to permit removal of the rim sections and plugs 15. As explained, a reverse operation will again tighten them in position thus enabling the rim sections to be removed and repaired, or have new rim sections applied to the spoke member, as desired.

As seen in the right hand side of Fig. 4 the pressing into the metal of grooves 16 will cause the formation of outer ridges 24. It is also to be noted that plugs 15 are preferably formed on the same curvature as that of the rim sections, and the socket members 12 also formed on the same curvature as shown in Fig. 1. Or if the plugs are straight the socket members may be straight as shown in Fig. 3. The curvature referred to in the socket member, however, makes a better finished appearance as will be understood in Fig. 1. The channel member forming the spoke member will preferably be metal of about $\frac{1}{16}$ of an inch thickness, but any other thickness may be used as desired.

The exterior covering 22 of the rim sections 2 and 3 is of any suitable plastic material and will be applied over the rim sections by pulling the plastic over the tube by a longitudinal pull after the manner referred to in my copending application, Serial No. 522,049, filed Feb. 12, 1944. This covering 22 may be permanently or temporarily yieldable and comprise any desirable ornamental covering material such as plastic, rubber, yieldable textile or fabric, or other material adapted to the purposes disclosed. To facilitate pulling the covering tube 22 over the inner metal tube of the rim section and holding the same firmly thereon after being applied, I make use of any of the many available lubricants such as soap, a phenolic glue, a plasticizing glue, or any other suitable glue, cement, or lubricating agent desired, which when it sets will grip the covering onto the metal tube. With a Vinylite tubing and a phenolic glue as a lubricant, the use of heat or baking at a suitable temperature will make a natural adhesion to the rim. When using plastic as a covering material I prefer any suitable thermoplastic resin available on the market, one of which that might be mentioned being Vinylite, although as will be understood, there are many vinyl and other resins having yieldable properties, any of which I may use if desired. As stated, rubber may be used as well as any of the many rubber-like plastics.

As shown in Figs. 1 and 10 I will preferably apply any suitable ornamental plastic 25 to the upper side of the spoke member, which platsic may be premolded and secured in position by screws or the like 26, or if preferred such plastic may be molded onto the upper surface of the spoke member between the flanges 6 and 7, to provide an ornamental covering for the spoke member and extend any desirable distance around the socket member 12. As shown in the right hand side of Fig. 1 the plastic covering 25 is extended only partway over the socket member 12 leaving the ridges 24 available for gripping surfaces, although it may extend further if desired. As seen in Fig. 1 the plastic or other ornamental covering 22 is extended to abut the ornamental ferrules 20. The plastic covering 25 for the spoke arm will preferably stop short of the center as shown at 26 to form a space to receive the ornamental cap for the top end of the steering post.

In Fig. 6 I have shown a modified form of joint or connection between the rim sections and the spoke member, in which form the side flanges 6 and 7 are formed at the ends as eyelets 27, the bottom portion of the channel member extending a suitable distance as shown at 28, so that after the joint is formed, this extension may be bent upwardly and inwardly partway around the joint, and afterward have plastic material applied therearound or in abutting relation as will be better understood in Fig. 9. In the form shown in Fig. 6 the inner tube 21 of the rim section is extended beyond the end of the covering 22 to form extensions 29 and 30 each of which are provided with screw threaded holes 31, to receive screws 32 which also screw into screw threaded openings 33 in the sleeve 34, which sleeve is positioned between the eyelets 27 with its longitudinal opening in registry with the opening in the eyelets after which the extensions 29 and 30 of the rim tube are extended through the eyelets and into the ends of sleeve 34, with the ends 35 of the covering 22 contacting the outer faces of the eyelets. This positions the inner ends of extensions 29 and 30 into abutting contact, or nearly abutting contact, as shown at 36 in Fig. 7, at which time screws 32 are screwed into place into holes 33 and 31.

As noted in Figs. 6 and 7 the sleeve 34 and extensions 29 and 30 are preferably curved on the same radius as that of the rim sections. If, however, it is so desired, sleeve 34 and extensions 29 and 30 may be straight although, to have them curved gives a more pleasing appearance to the finished steering wheel. When the parts are thus assembled the ends 28 of the bottom of the channel member are curved inwardly into contact with sleeve 34, and plastic material extended from the upper portion of the spoke member to any desired distance around sleeve 34 and/or extension 28 in order to give an ornamental finish.

In the form shown in Fig. 8 the inner tube 21 of the rim sections is extended outwardly beyond the end 35 of the covering 22 to form tubular extensions 37 and 38 which are internally screw threaded to receive the right and left hand threads 39 and 40 of the turn-buckle 41 which, when the nut 42 is rotated by a wrench, will draw the ends of extensions 37 and 38 inwardly until the ends thereof contact, or nearly contact, the sides of nut 42, at which time the ends 35 of the covering will contact the outer side faces of the eyelets 27. It is understood that in this form, the outer ends of the flanges 6 and 7 are formed into eyelets 27 similar to those in Figs. 6 and 7. Also in the form shown in Fig. 8, and in order to hide nut 42, the extending end 43 of the bottom of the channel member is of sufficient length to curl upwardly and inwardly to form a covering for these parts, and a flange similar to the flange 14 in Fig. 4 is clamped by nuts similar to nuts 18 in Fig. 1, against the bottom plate of the channel spoke member. When it is desired to remove the clamping nuts just referred to, it is only necessary to bend the socket member thus formed, open far enough to permit a wrench to be applied to nut 42. The rim sections may then be removed and a new section, or a repaired section, applied in the manner described above. Or if desired, the extension 43 may be shorter, similar to that shown in Fig. 6, and bent up a short distance around nut 42 and these parts covered with plastic material as described above in connection with Figs. 6, 7 and 9.

In order to provide finger gripping projections on the outer face of the covering of the rim sections, I have shown how this may be done in Figs. 11-14. As seen in Fig. 11 the plastic rivet of the kind now available on the market and known as "nylon rivet," indicated generally at 44, may be driven through registering holes in the covering and inner tube. These rivets are formed of plastic material and have an outside stem 45 which, after the prongs 46 of the rivet (which are then closed together) have been passed through the registering openings, is driven inwardly to force prongs 46 outwardly to bring their shoulder under and in contact with the inner face of the inner tube 21, to prevent these rivets from being removed. When in this position, shown at 45' in Fig. 11, the stem 45 holds the prongs outwardly against removal. The plastic head 47 on the outside of the covering, forms a raised portion for the fingers of the operator to grip, and may be spaced around the rim section in any plurality of positions desired.

In the form shown in Fig. 12 the plastic screw 48 is screwed into the plastic of the covering 22 and into a registering opening in the inner tube 21. In this type of screw a Phillips head 49 may be used, or other kind of screw driver slot, as desired. In this form the plastic head 50 likewise forms an ornamental finger grip on the outer face of the covering 22 and may be spaced around the rim sections in a plurality of positions as desired.

The form of finger grip shown in Fig. 14 is similar to that shown in Fig. 11, except that a flat outer head 51 is used instead of the spherically shaped 47 in Fig. 11.

The inner tube 21 of the rim sections may be either tubular or solid in cross section as desired. When a solid rim section is used the plug 15 is eliminated and the solid rod extended outwardly similar to the extension 15 in Fig. 2. As stated above a nut will be screwed onto the top end of the steering shaft above the bottom of the channel member and be positioned in the space 52 shown in Fig. 9, which nut, however, has been omitted for the sake of clearness. In Fig. 8 the parts forming the connecting joint between the flanges 6 and 7 are straight, rather than curved, in order to provide for rotation of the screw threads 39 and 40.

It is thus seen that I have provided a steering wheel having a single spoke arm extending preferably in a straight line, and having its ends formed to detachably secure thereto the adjacent ends of the two rim sections which are preferably formed in the shape of approximately a half circle. Also by having the plastic or other suitable covering material on the rim sections, and a plastic material covering the various joints and top of the spoke member, I have provided a steering wheel of pleasing appearance, great strength, and one enabling easy replacement of a new, or repaired rim section.

Having described my invention, I claim:

1. In a steering wheel a flat metallic spoke member formed at each end with an integral bent over socket member, a pair of arcuate rim sections each having an extended end inserted into a socket member, and means for detachably securing said extended ends of the rim sections in said socket members, the two sides of each of said socket members normally standing a distance apart until two adjacent ends of said extended ends are inserted into the socket thereof one from each side, said means drawing said two sides tightly against said extended ends when the latter are inserted into the socket, said spoke member having a flange extending longitudinally along each of its side edges but terminating at the socket member, the free end of each of said socket members being seated between said flanges when the two sides of the socket members are tightened over the rim section extended ends.

2. In a steering wheel a flat metallic spoke member formed at each end with an integral bent over socket member, a pair of arcuate rim sections each having an extended end inserted into a socket member, and means for detachably securing said extended ends of the rim sections in said socket members, the two sides of each of said socket members normally standing a distance apart until two adjacent ends of said extended ends are inserted into the socket thereof one from each side, said means drawing said two sides tightly against said extended ends when the latter are inserted into the socket, said extended ends each having annular beads and the inner face of each of the socket members having annular grooves, said beads being gripped in said grooves when the socket member is tightened, said spoke member having side flanges between which the free end of each socket member seats when the socket member is tightened.

3. In a steering wheel a spoke member formed at each end with a bent over socket member, a pair of tubular arcuate rim sections each having an extended plug tightly gripped in each open end of the tube and inserted into a socket member with the free ends of the adjacent plugs approximately abutting each other within the socket member, and means for detachably securing said extended ends of the rim sections in said socket members.

4. In a steering wheel, a flat metallic spoke member having along the greater portion of each of its side edges an upstanding flange, the end portions of the spoke member for a substantial length being flangeless, each of said end portions being curved upwardly and inwardly to form a bent over socket member, a pair of arcuate rim sections each having at each end an extended projection inserted into one of the socket members so that each adjacent pair of said projections substantially abut within one of the socket members, and means for tightly clamping said extended projections within the socket members, whereby the rim sections may be readily detached from the spoke member when desired, the free end of each of said socket members being seated between said flanges.

5. A steering wheel as claimed in claim 4, in which the outer surfaces of the rim end projections are formed with circumferential beads, and the inner surfaces of the socket members are formed with circumferential grooves to receive said beads when the socket members are clamped around said extended projections, a one-piece plastic covering on each of said rim sections, and an ornamental ferrule between each end of each of the plastic coverings and the adjacent socket members.

6. In a steering wheel, a metallic spoke member having integral ends each curved upwardly and inwardly over itself to form a socket member, a pair of tubular arcuate rim sections each having a metallic plug tightly fastened in each end and extending a distance therefrom, each of said plugs being inserted into a socket member so that the adjacent pair of plugs in each socket member extends a substantial distance thereinto, and means for detachably clamping each socket member over a pair of said plugs, whereby said rim sections may be readily detached from the spoke member when desired.

7. A steering wheel as claimed in claim 6, in which each plug has on its protruding portion a raised portion, and each socket member has complemental recesses to receive said raised portions when clamped thereover.

8. In a steering wheel, a continuous one-piece metallic spoke member having its end portions each curved upwardly and inwardly over itself to form a socket member, a pair of arcuate rim sections each having at each end a projection inserted a substantial distance into a socket member so that there will be two of said projections in each socket, the inner end of each socket member having an inwardly extending flange which stands away from the body of the spoke member when the rim projections are inserted into the sockets, and means for tightening said socket member flanges against the body of the spoke member to detachably clamp the rim projections within the socket member whereby the rim sections may be readily detached from the spoke member when desired.

9. In a steering wheel, a continuous one-piece metallic spoke member having its end portions each curved upwardly and inwardly over itself to form a socket member, a pair of arcuate rim sections each having at each end a projection inserted a substantial distance into a socket member so that there will be two of said projections in each socket, means for clamping the socket members against the body of the spoke member to grip the rim projections in the sockets, the metal of the socket members being somewhat resilient so that when said means are released the socket members will open up and permit removal of the rim projections for repair, replacement and the like.

10. In a steering wheel, a flat metallic spoke member having integral curled end portions each providing a socket, a pair of arcuate tubular rim sections each having at each end a metal projection formed with annular beads, each of said sockets having grooves complemental to said beads, each of said curled end portions being resilient to enable enlargement of the socket, said rim projections being inserted in said sockets, and means for clamping said curled end portions against the rim projections with the beads held tight in said grooves, each of said rim section metal projections comprising a plug tightly gripped in the end of the rim tube.

HARRY F. GEORGE.

REFERENCES CITED

The following references are of record in the file of this patent:

UNITED STATES PATENTS

| Number | Name | Date |
|---|---|---|
| 1,801,283 | McManus | Apr. 21, 1931 |
| 2,187,193 | Bright | Jan. 16, 1940 |
| 2,187,604 | Husted | Jan. 16, 1940 |
| 2,269,492 | Sorensen | Jan. 13, 1942 |
| 1,433,118 | Browne | Oct. 24, 1922 |
| 2,311,317 | Tegarty | Feb. 16, 1943 |
| 1,967,060 | Mungen | July 17, 1934 |
| 2,041,739 | Beck | May 26, 1936 |
| 1,079,881 | Reagles | Nov. 11, 1913 |

FOREIGN PATENTS

| Number | Country | Date |
|---|---|---|
| 675,211 | France | Oct. 29, 1929 |
| 696,756 | Germany | Sept. 28, 1930 |
| 260,850 | Great Britain | Nov. 11, 1926 |